(No Model.)
J. CORNELL.
HALTER TIE.
No. 536,511. Patented Mar. 26, 1895.
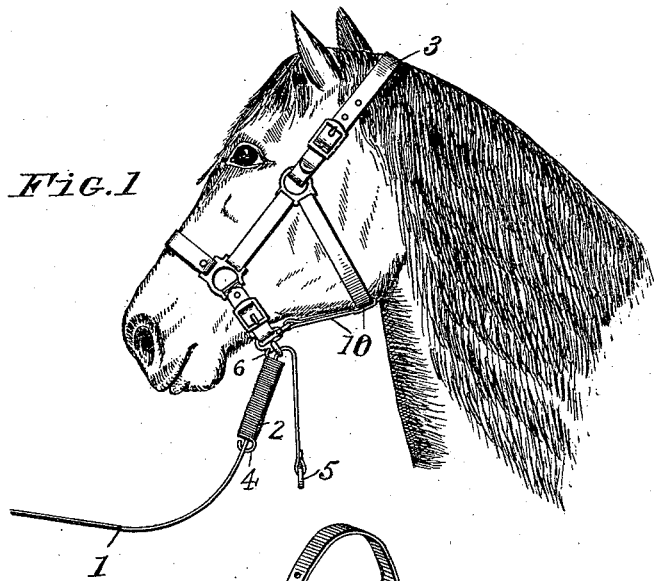
Fig. 1
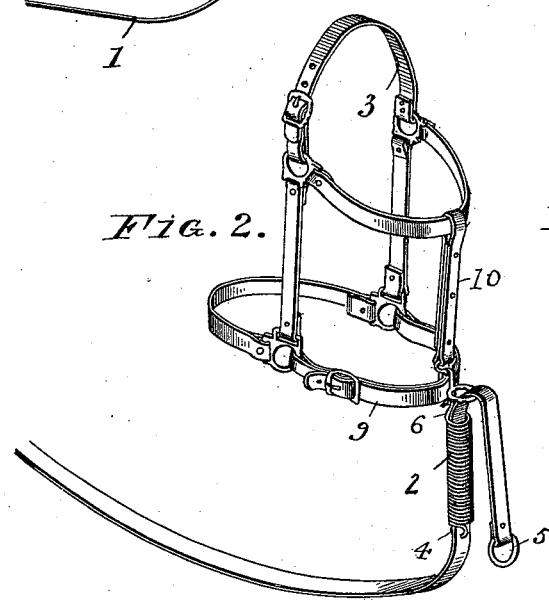
Fig. 2.
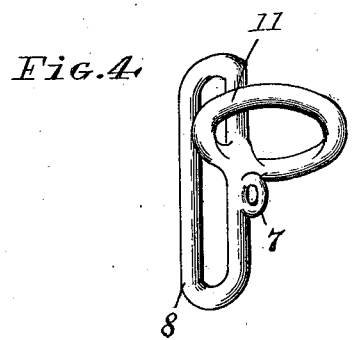
Fig. 4.
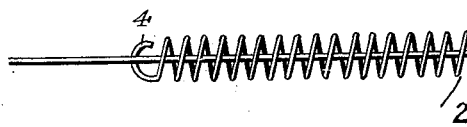
Fig. 3.
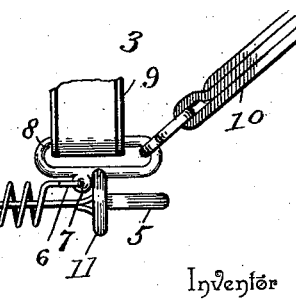
Inventor
Joseph Cornell,
By his Attorneys,
C. A. Snow & Co.
Witnesses
Julius Ulke, Jr.
H. F. Riley
THE NORRIS PETERS CO., PHOTO-LITHO., WASHINGTON, D. C.

UNITED STATES PATENT OFFICE.

JOSEPH CORNELL, OF POTSDAM, NEW YORK.

HALTER-TIE.

SPECIFICATION forming part of Letters Patent No. 536,511, dated March 26, 1895.

Application filed October 11, 1894. Serial No. 525,620. (No model.)

*To all whom it may concern:*

Be it known that I, JOSEPH CORNELL, a citizen of the United States, residing at Potsdam, in the county of St. Lawrence and State of New York, have invented a new and useful Halter-Tie, of which the following is a specification.

The invention relates to improvements in halters.

The object of the present invention is to provide for halters a yielding tie, which will permit an animal to lie down comfortably, and which, when an animal rises, will take up the slack, and prevent the horse from getting its legs tangled in the halter-tie.

A further object of the invention is to relieve the halter tie from sudden strains to prevent injury to it, and to prevent sudden jars from being communicated to the head of the animal, incident to sudden movements of the head in endeavoring to brush flies or insects from it.

Another object of the invention is to prevent a horse from standing back in the stall the full length of the halter-tie, and to thereby avoid kicking and other accidents ofttimes resulting from such a habit.

The invention consists in the construction and novel combination and arrangement of parts hereinafter fully described, illustrated in the accompanying drawings, and pointed out in the claim hereto appended.

In the drawings: Figure 1 is a side view showing a halter provided with my improvements, applied to a horse. Fig. 2 is a perspective view of a halter detached. Fig. 3 is a side view of the same showing the tie extended. Fig. 4 is a detail perspective view of the loop and ring.

Like numerals of reference indicate corresponding parts in all the figures of the drawings.

1 designates a halter-tie having disposed on it at a point intermediate of its ends an extensible spiral spring 2, and connected by the same with a halter 3 of any preferred construction. The outer end of the spring 2 is connected by an eye or loop 4 with the strap or tie 1, and the latter extends through the spring and inward beyond the same, about eighteen to twenty inches, and is provided at its inner end with a ring 5, adapted to form a stop to limit the outward extension of the tie, as illustrated in Fig. 3 of the accompanying drawings.

The inner end of the spring is provided with an eye or loop 6, linked into an opening or eye 7 of an oblong or flattened loop 8, which is loosely arranged on the throat latch 9 of the halter, and which serves as a convenient means for connecting the strap 10 with the throat latch. The loop 8 has rigidly secured to it, or forming a part thereof, a ring 11 through which passes the inner portion of the tie, and which is adapted to be engaged by the stop 5 to relieve the spring of strain, when the tie is entirely extended, to prevent any liability of breaking the spring. This arrangement provides a yielding halter tie, which is adapted to permit an animal to lie comfortably in a stall, and which, when the animal rises, is capable of taking up the slack, automatically, to prevent it from becoming tangled in the legs of a horse.

The strength of the spring may be from three to sixteen pounds, and the spring prevents any sudden jerks on the tie, or sudden jars being communicated to the head of the animal, and avoids breakage of the tie. It will also be apparent that the yielding hitching strap or tie of the halter is adapted to counteract the habit in horses of standing back in the stall, as far as the halter-tie will permit, and that it will avoid accidents usually resulting from such a habit.

Although in the accompanying drawings the halter tie is shown consisting of a strap, yet it will be readily apparent that a rope or other form of tie may be employed, and that the yielding tie may be provided with other forms of stops to relieve the spring of excessive strain, and that the yielding tie may be used in connection with any ordinary form of halter. In leading a horse it prevents any sudden jerks or strains from being communicated to the head of the animal, thereby enabling a horse to be lead smoothly and gently.

Changes in the form, proportion, and the minor details of construction may be resorted to without departing from the principle or sacrificing any of the advantages of this invention.

What I claim is—

The combination with a halter, of the oblong loop 8 loosely arranged on the throat latch of the halter, and provided with an eye or opening 7 and having a rigid ring 11, arranged at right angles to and depending from the loop, a spiral spring having its inner end hooked into the eye or opening 7 of the loop, and a strap passing through the spiral spring and secured to the outer end thereof, and having its inner portion extended beyond the spring, passed through the ring 11 and provided with a stop ring of greater diameter than the interior of the ring of said loop, substantially as and for the purpose described.

In testimony that I claim the foregoing as my own I have hereto affixed my signature in the presence of two witnesses.

JOSEPH CORNELL.

Witnesses:
FRANK J. CORNELL,
LUTHER E. WADLEIGH.